US012769838B2

(12) United States Patent
Bessiere et al.

(10) Patent No.: US 12,769,838 B2
(45) Date of Patent: Oct. 20, 2026

(54) METHOD FOR MODIFYING SOFTWARE IN A MOTOR VEHICLE

(71) Applicant: RENAULT S.A.S, Boulogne Billancourt (FR)

(72) Inventors: Sebastien Bessiere, Tournefeuille (FR); Arnaud Devreese, Leguevin (FR); Thibaud Dravigny, Paris (FR); Benoit Fradin, Fonsorbes (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 265 days.

(21) Appl. No.: 18/042,328

(22) PCT Filed: Jul. 27, 2021

(86) PCT No.: PCT/EP2021/071041

§ 371 (c)(1),
(2) Date: Feb. 21, 2023

(87) PCT Pub. No.: WO2022/042981

PCT Pub. Date: Mar. 3, 2022

(65) Prior Publication Data

US 2024/0028731 A1 Jan. 25, 2024

(30) Foreign Application Priority Data

Aug. 26, 2020 (FR) ..................................... 20 08706

(51) Int. Cl.
*G06F 21/57* (2013.01)
*G06F 8/65* (2018.01)
*G06F 21/44* (2013.01)

(52) U.S. Cl.
CPC .............. *G06F 21/572* (2013.01); *G06F 8/65* (2013.01); *G06F 21/44* (2013.01); *G06F 2221/033* (2013.01)

(58) Field of Classification Search
CPC .......... G06F 21/572; G06F 8/65; G06F 21/44; G06F 2221/033
USPC ............................................................ 726/21
See application file for complete search history.

(56) References Cited

U.S. PATENT DOCUMENTS

| | | | | |
|---|---|---|---|---|
| 8,856,536 | B2 * | 10/2014 | Rabadi | H04L 9/30<br>713/193 |
| 10,447,483 | B1 | 10/2019 | Su | |
| 10,999,078 | B2 * | 5/2021 | Kawabata | H04L 9/16 |
| 2016/0371077 | A1 | 12/2016 | Moeller et al. | |

(Continued)

FOREIGN PATENT DOCUMENTS

| | | | |
|---|---|---|---|
| DE | 10 2016 210 672 | A1 | 12/2016 |
| WO | WO 2019/126525 | A1 | 6/2019 |

OTHER PUBLICATIONS

International Search Report issued Oct. 19, 2021 in PCT/EP2021/071041, filed on Jul. 27, 2021, 2 pages.

(Continued)

*Primary Examiner* — Moeen Khan
(74) *Attorney, Agent, or Firm* — Oblon, McClelland, Maier & Neustadt, L.L.P.

(57) ABSTRACT

A method for modifying software in a motor vehicle includes a step of receiving software data and deployment data and steps of verifying the deployment data. If the verification steps are validated, software is modified in the motor vehicle via the software data.

9 Claims, 4 Drawing Sheets

(56) References Cited

U.S. PATENT DOCUMENTS

| | | | | |
|---|---|---|---|---|
| 2017/0060559 | A1 | 3/2017 | Ye et al. | |
| 2018/0217828 | A1* | 8/2018 | Madrid | H04L 9/3247 |
| 2018/0336024 | A1* | 11/2018 | Klische | G06F 8/65 |
| 2019/0187971 | A1 | 6/2019 | Wang et al. | |
| 2019/0394046 | A1 | 12/2019 | Su | |
| 2021/0191707 | A1* | 6/2021 | Ullman | B60K 35/20 |

OTHER PUBLICATIONS

French Preliminary Search Report issued Apr. 20, 2021 in French Application 20 08706, filed on Aug. 26, 2020, 3 pages (with English Translation of categories of cited documents).

* cited by examiner

METHOD FOR MODIFYING SOFTWARE IN A MOTOR VEHICLE

TECHNICAL FIELD

The present invention relates to a method for bringing about a software modification in a motor vehicle, to an automotive computer, to a computer program product for implementing the method and to a removable storage medium.

PRIOR ART

Current motor vehicles comprise a high number of detectors, of devices and/or of systems that are capable of assisting a driver in his driving tasks, for example when an autonomous or semi-autonomous vehicle is being driven. Such detectors are, for example, one or more cameras, infrared detectors, radio-frequency detectors, a LIDAR system (LIDAR being the acronym of LIght Detection and Ranging), etc. These detectors are placed inside the vehicle and/or outside it. In order to exploit these various sensors, the motor vehicle incorporates in its computers a number of pieces of firmware or embedded software. This embedded software allows the computer to change, for example so as to incorporate new functionalities, without there being any need to completely revise the design of said computer. It is thus sometimes necessary to update this embedded software or to incorporate new software into the motor vehicle. Document WO2019126525 discloses a method for updating software within a motor vehicle. In this method, the data to be updated are encrypted using a specific key and then transmitted to the motor vehicle. The transmitted data are then decrypted in said motor vehicle via a private key. Although this method allows embedded software to be updated securely, the motor vehicle on the whole remains passive with respect to this update. Specifically, it is not possible for it to refuse the update, for example if the update is incompatible with specific characteristics of the motor vehicle or if the update does not correspond to a predefined update context (update location, update period, update instigator (engineer, factory, dealership, end customer)). Specifically, in the context of an update of embedded software in a motor vehicle, two supervisory authorities are generally involved. The first supervisory authority, called the primary supervisory authority, is the one that provides the software data to be updated—it is typically the manufacturer of the motor vehicle. This primary supervisory authority defines the security and applicability policies that must be respected. These policies must be easily configurable by a second supervisory authority, called the secondary supervisory authority, which is responsible for deploying updates. The operational constraint is that the primary supervisory authority which generates the software data and the secondary supervisory authority in charge of deploying these software data are not physically the same. Thus, attackers (in the cyber-security sense) could modify the content of the software data or the deployment properties of these contents, and this could trigger problems with execution of the software data thus modified in the motor vehicle.

There is therefore a need to improve the security of modification of embedded software in motor vehicles, in particular when the context of this modification comprises a certain number of restrictions such as space or time restrictions.

SUMMARY OF THE INVENTION

The present invention aims to at least partially meet this need.

More particularly, the present invention aims to increase the security of software updates in a motor vehicle, in particular when a plurality of entities are responsible for implementing these updates.

A first subject of the invention relates to a method for bringing about a software modification in a motor vehicle, said method comprising the following steps:

- a step of receiving a first data group and a second data group, said first data group comprising software data and general software-deployment data, said general software-deployment data having been signed by a primary supervisory authority, said second data group comprising specific software-deployment data, said specific software-deployment data having been signed by a secondary supervisory authority;
- a first step of verifying the signature of the specific software-deployment data;
- the motor vehicle having specific characteristics, a second step of verifying the compatibility of the specific software-deployment data with said specific characteristics of the motor vehicle;
- a third step of verifying the signature of the general software-deployment data;
- a fourth step of verifying the compatibility of the specific software-deployment data with the general software-deployment data;
- if the first verifying step, the second verifying step, the third verifying step and the fourth verifying step are validated, a step of modifying software in the motor vehicle via the software data of the first data group.

The invention makes it possible to create a two-level signature by separating the roles of the different primary and secondary supervisory authorities. The primary supervisory authority is thus responsible for digital signature of the software data. This primary authority also generates general deployment data, which are also referred to as deployment permissions. The secondary supervisory authority for its part manages actual deployment of the software data. This secondary supervisory authority is in charge of providing the actual deployment policies and of signing them digitally. It thus adds information for which it is responsible, and which supplements the deployment permissions of the primary supervisory authority. The automotive computer will then verify that the digital signatures and also the actual deployment policies comply with the deployment permissions and the specific characteristics of the motor vehicle. Thus, the invention allows a cryptographic separation of privileges upstream between the primary supervisory authority and the secondary supervisory authority. It also allows verification to be performed downstream in the computer implementing the software modification. This method further permits a high degree of flexibility in said software modification. Specifically, the deployment permissions are set in an intangible way by the primary supervisory authority. The specific deployment data may for their part be adapted by the secondary supervisory authority, for example, in the event of return of a software fault in a given vehicle range, it is the vehicles of this range that will be specifically targeted by a software modification.

In one particular embodiment, the general deployment data of the software comprise at least one of the following criteria for deployment of the software:

- a general space criterion for software deployment;
- a general time criterion for software deployment;
- a general identification criterion for identifying the vehicles concerned by the software deployment.

Use of all or some of these general criteria allows deployment permissions defining a fairly broad software-deployment framework to be generated.

In one particular embodiment, the specific deployment data of the software comprise at least one of the following criteria:

- a specific space criterion for software deployment;
- a specific time criterion for software deployment;
- a specific identification criterion for identifying the vehicles concerned by the software deployment.

Use of all or some of these specific criteria allows actual deployment permissions defining a fairly precise software-deployment framework to be generated.

In one particular embodiment, the general space criterion defines the possible locations in which software deployment may be carried out, such as in a factory, at a dealership, or at an individual's home, and the specific space criterion is a choice among these various locations.

In one particular embodiment, the general time criterion defines the time ranges in which software deployment may be carried out, and the specific space criterion is a choice among these various time ranges.

In one particular embodiment, the general identification criterion defines a type of identifier, such as a vehicle identification number, and the specific identification criterion is a choice of a group of identifiers for this type of identifier.

The type of identification used is for example a VIN code (VIN being the acronym of Vehicle Identification Number). The VIN code is a unique alphanumeric code that is given to each and every vehicle. This code is standardized and has 17 characters. It is present at least twice on a vehicle, for example on part of the chassis of the vehicle or on the manufacturer's plate. It is also integrated into its automotive computer and it is one of the specific characteristics of the motor vehicle.

In one particular embodiment, the general software-deployment data comprise a digital fingerprint of the software data, said digital fingerprint having been obtained by a hash function, and this digital fingerprint is compared with a digital fingerprint generated in the motor vehicle from the software data with a view to implementing the software-modifying step.

The hash function used is for example an SHA or MD5 cryptographic function (SHA being the acronym of Secure Hash Algorithm and MD5 the acronym of Message Digest 5). These are functions that, for an input dataset, will generate a unique digital fingerprint. So for two different input datasets, two different digital fingerprints would be generated by the hash function. Therefore any alteration of the input data leads to generation of a different digital fingerprint by the hash function. Thus, it is sufficient to verify the integrity of the digital fingerprint to assess whether or not the software data have been modified maliciously. It is not necessary to verify the integrity of all the software data. The data processing required to achieve the software modification in the motor vehicle is thus facilitated.

In one particular embodiment, the general software-deployment data are signed with a first private key and said signature is verified with a first public key associated with said first private key. The specific software-deployment data are signed with a second private key and said signature is verified with a second public key associated with said second private key.

The first private key is held by the primary supervisory authority. The second private key is held by the secondary supervisory authority. The first public key and the second public key are placed in the computer of the motor vehicle during manufacture of said motor vehicle. Through use of asymmetric cryptography, it is possible to ensure secure transmission of data between, on the one hand, the primary supervisory authority and secondary supervisory authority, and on the other hand, the motor vehicle. Furthermore, even should the first public key and the second public key be cracked by a malicious participant, the latter would be unable to determine the first private key and the second private key held by the primary supervisory authority and by the secondary supervisory authority, respectively.

In one particular embodiment, the software modification is introduction of new software and/or update of software already installed in said vehicle.

In one particular embodiment, the first data group and the second data group are received by connecting, to said motor vehicle, a removable storage medium such as a USB key, and the specific deployment data of the software comprise at least one criterion related to said removable storage medium.

Use of a removable storage medium allows a greater amount of data to be securely transmitted than is possible with the wireless technology called firmware over-the-air (FOTA). Furthermore, it is not necessary for the motor vehicle to be a so-called connected vehicle for software updates to be possible. Lastly, use of a removable storage medium makes it possible to avoid malicious DDoS attacks (DDoS being the acronym of Distributed Denial of Service).

Another subject of the invention relates to an automotive computer comprising means for receiving a first data group and a second data group. Said first data group comprises software data and general software-deployment data, said general software-deployment data having been signed by a primary supervisory authority. Said second data group comprises specific software-deployment data, said specific software-deployment data having been signed by a secondary supervisory authority. The computer comprises means for verifying the signature of the specific software-deployment data. Since the motor vehicle has specific characteristics, the computer comprises means for verifying the compatibility of the specific software-deployment data with said specific characteristics of the motor vehicle. The computer comprises means for verifying the signature of the general software-deployment data, means for verifying the compatibility of the specific software-deployment data with the general software-deployment data, and means for modifying software in the motor vehicle via the data software of the first data group.

Another object of the invention relates to a computer program product comprising program instructions that are exploitable by the above automotive computer, which, when they are executed or interpreted by said computer, trigger implementation of the above method for bringing about a software modification in a motor vehicle.

Another subject of the invention relates to a removable storage medium comprising means for storing a first data group and a second data group, said first data group comprising software data and general software-deployment data, said general software-deployment data having been signed by a primary supervisory authority, said second data group comprising specific software-deployment data, said specific software-deployment data having been signed by a secondary supervisory authority. The storage medium comprises means for transferring the first data group and the second data group to the motor vehicle, the signature of the specific software-deployment data being intended to be verified in said motor vehicle in a first verifying step, the specific deployment data of the software being intended to be verified in order to assess their compatibility with specific characteristics of the motor vehicle in a second verifying step, the signature of the general software-deployment data being intended to be verified in said motor vehicle in a third verifying step, the specific software-deployment data and the general software-deployment data being intended to be verified in order to assess their compatibility in a fourth verifying step. The software data of the first data group are intended to perform a software modification in the motor vehicle if the first verifying step, the second verifying step, the third verifying step and the fourth verifying step are validated.

The present invention will be better understood on reading the detailed description of embodiments, which are given by way of completely non-limiting example, and illustrated by the appended drawings, in which.

The invention is not limited to the embodiments and variants described and other embodiments and variants will appear obvious to those skilled in the art.

In the various figures, identical or similar elements have been designated by the same references.

Figure 1:
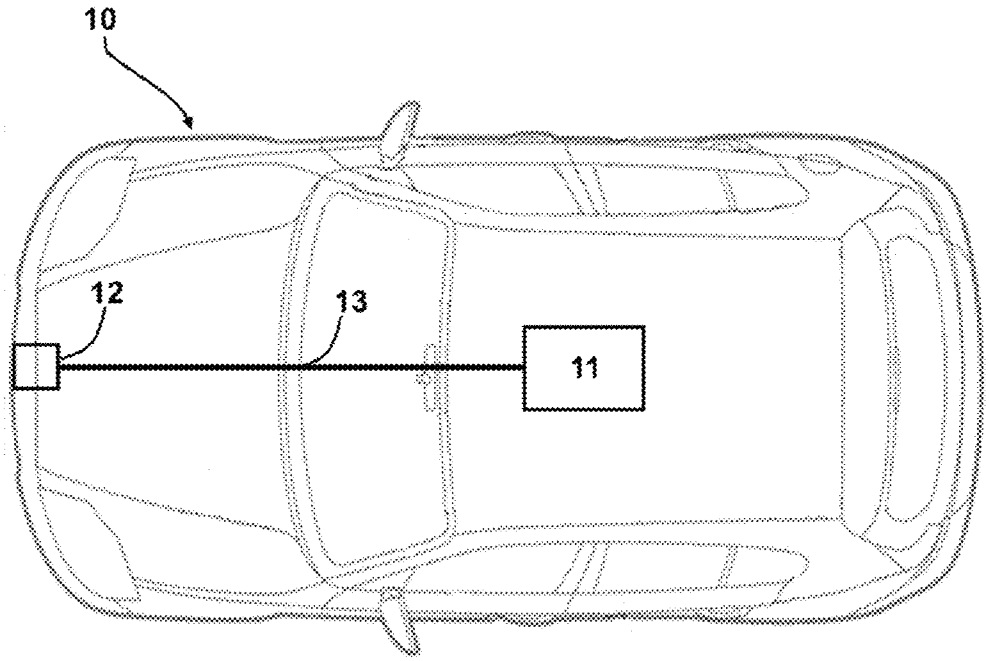
FIG. 1 is a schematic view illustrating a motor vehicle comprising a computer according to the invention.

FIG. 1 schematically shows a motor vehicle 10. This motor vehicle 10 comprises a computer 11, a plurality of ECUs only one ECU 12 of which has been shown (ECU being the acronym of Electronic Control Unit), and a communication network 13 for communication between the computer 11 and the ECU 12. The ECU 12 makes it possible, for example, to control a camera located at the front of the motor vehicle 10. In one particular embodiment, this camera is suitable for measuring distances to other real participants (cars, pedestrians, animals, etc.) around the motor vehicle 10. This measurement is laser remote sensing or LIDAR (LIDAR being the acronym of LIght Detection And Ranging). Laser remote sensing is a remote measurement technique based on the analysis of the properties of a beam of light returned to its emitter. The ECU 12 is also able to transmit this distance information via the communication network 13 to the computer 11, which will then process it. The computer 11 comprises a certain number of pieces of firmware for operating the camera. These pieces of firmware must be updated and/or replaced regularly to optimize operation of this camera.

Figure 2:
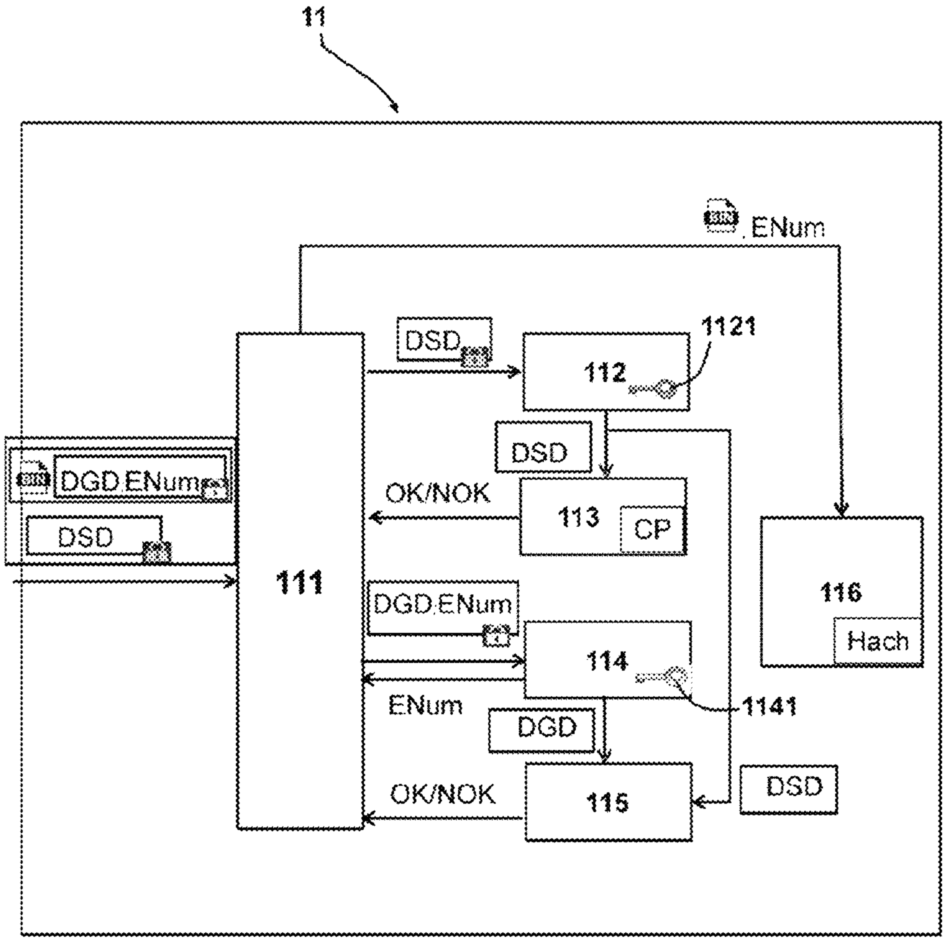
FIG. 2 is a schematic view detailing the components of the computer of FIG. 1.

FIG. 2 details the components of the computer 11 that are used to achieve a software modification in the motor vehicle. This computer 11 thus comprises:

means 111 for receiving data;

first verifying means 112;

second verifying means 113;

third verifying means 114;

fourth verifying means 115;

software-modifying means 116.

The means 111 for receiving data are able to receive a first data group. The first data group comprises: software data BIN, a digital fingerprint Enum of the software data, and general software-deployment data DGD. The software data BIN correspond to the code lines for updating the existing firmware and/or to the new firmware to be installed in the motor vehicle. The digital fingerprint Enum corresponds to the result of a hash function applied to the software data BIN.

The general software-deployment data DGD comprise at least one of the following criteria for software deployment:

a general space criterion CGE for software deployment;

a general time criterion CGT for software deployment;

a general identification criterion CGI for identifying the vehicles concerned by the software deployment.

The general space criterion CGE defines the possible locations in which software deployment may be carried out, such as in a factory, at a dealership, or at an individual's home.

The general time criterion CGT defines the time ranges in which software deployment may be carried out.

The general identification criterion CGI defines a type of identifier on which software deployment may be based. In one particular embodiment, this type of identifier is the VIN code of the motor vehicle or part of this VIN code.

Figure 3:
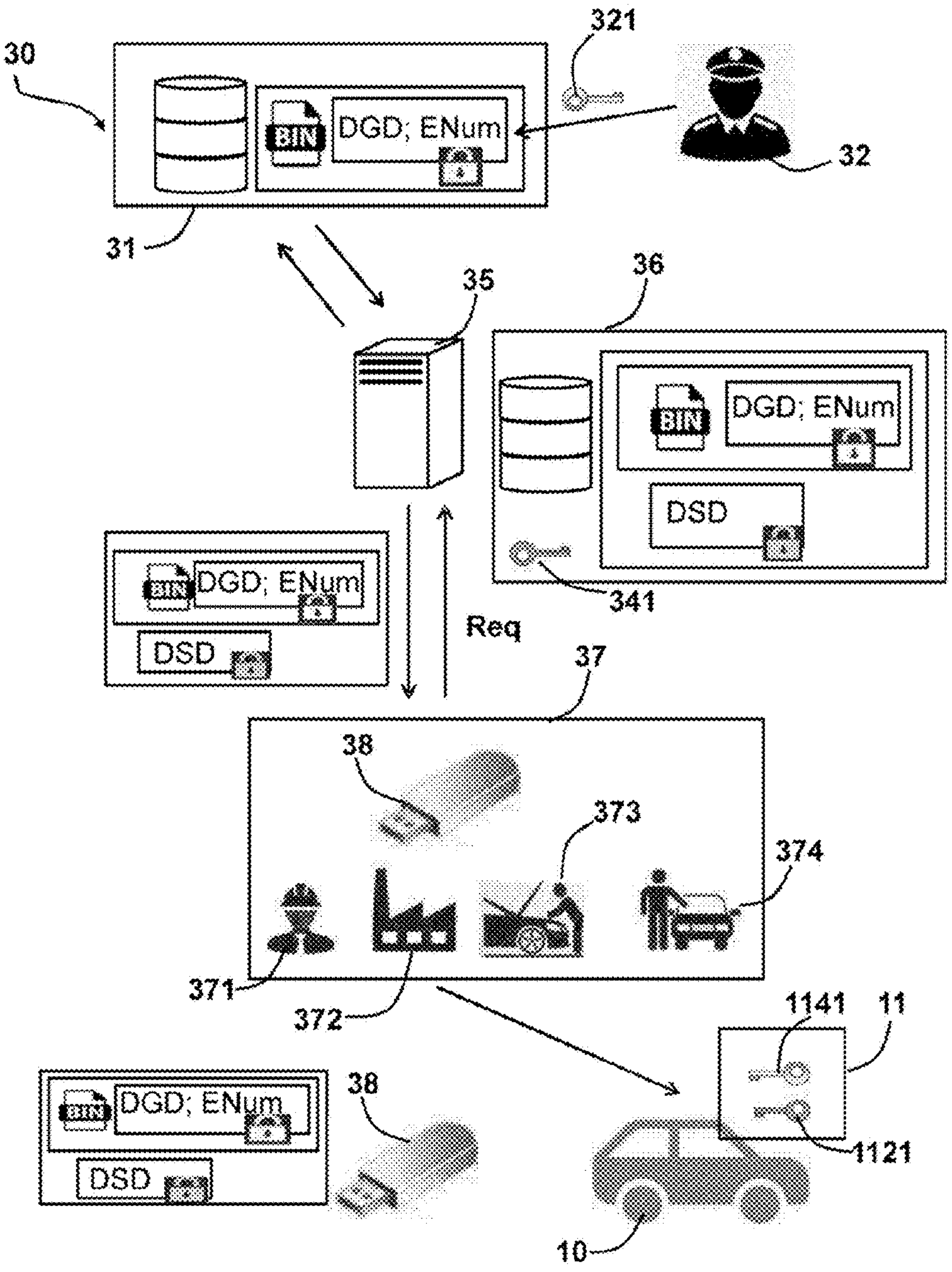
FIG. 3 is a schematic view of an architecture for implementing a method for bringing about a software modification in the motor vehicle of FIG. 1.

The general software-deployment data DGD are able to be signed by a primary supervisory authority 32 (see FIG. 3).

The means 111 for receiving data are also able to receive a second data group. The second data group comprises: specific software-deployment data DSD.

The specific software-deployment data DSD comprise at least one of the following criteria:

a specific space criterion CSE for software deployment;

a specific time criterion CST for software deployment;

a specific identification criterion CSI for identifying the vehicles concerned by the software deployment.

The specific space criterion CSE for software deployment is one or more choices among the various locations of the general space criterion CGE of the first data group.

The specific time criterion CST for software deployment is one or more choices among the various time ranges of the general time criterion CGT of the first data group.

The specific identification criterion CSI for identifying identification vehicles is a choice of a group of identifiers for the type of identifier of the general identification criterion CGI of the first data group.

The specific software-deployment data DSD are able to be signed by a secondary supervisory authority 34 (see FIG. 3).

The first verifying means 112 are able to verify the data signature of the second data group.

The second verifying means 113 are able to verify the compatibility of the specific deployment data DSD with the specific characteristics CP of the motor vehicle. These specific characteristics for example comprise the particular VIN code of the motor vehicle.

The third verifying means 114 are able to verify the data signature of the first data group.

The fourth verifying means 115 are able to verify the compatibility of the specific software-deployment data DSD with the general software-deployment data DGD.

The software-modifying means 116 are able to add one or more pieces of firmware and/or to update one or more pieces of firmware using the software data BIN of the first data group.

In one non-limiting example of operation, which is illustrated in FIG. 2, the computer 11 receives the first data BIN, DGD (CGE, CGT, CGI), ENum and the second data DSD (CSE, CST, CSI) via the receiving means 111. The data DGD (CGE, CGT, CGI), ENum of the first data have been signed beforehand by a first private key 321 (see FIG. 3) and the data DSD (CSE, CST, CSI) of the second data have been signed beforehand by a second private key 341 (see FIG. 3). The receiving means 111 transmit the data DSD (CSE, CST, CSI) to the first verifying means 112. These first verifying means 112 comprise a second public key 1121 complementary to the second private key 341 (see FIG. 3). Using this second public key 1121, the first verifying means 112 will decrypt the signature of the data DSD (CSE, CST, CSI). If the decryption succeeds, then the data DSD (CSE, CST, CSI) are transmitted to the second verifying means 113 and to the fourth verifying means 115. If the decryption fails, then the computer 11 deduces that the data DSD (CSE, CST, CSI) have not been signed by the correct participant. Hence, the process of bringing about a software modification ends. The second verifying means 113 comprise the specific characteristics CP of the motor vehicle. These specific characteristics CP are compared with the data DSD (CSE, CST, CSI). For example, the VIN code of the motor vehicle is compared to the list of VIN codes present in the specific identification criterion CSI. If this VIN code is found in this list, the second verifying means send an OK message to the receiving means 111, with a view to continuation of the process of software modification. Otherwise, a NOK message is transmitted to said receiving means 111 and the process ends. The receiving means 111 then transmit the data DGD (CGE, CGT, CGI), ENum, signed beforehand by the first private key 321, to the third verifying means 114. These third verifying means 114 comprise a first public key 1141 complementary to the first private key 321. Using this first public key 1141, the third verifying means 114 will decrypt the signature of the data DGD (CGE, CGT, CGI), Enum. If the decryption succeeds, then the data DGD (CGE, CGT, CGI) are transmitted to the fourth verifying means 115 and the digital signature Enum is transmitted to the receiving means 111. If the decryption fails, then the computer 11 deduces that the data DGD (CGE, CGT, CGI), ENum have not been signed by the correct participant and the process of software modification stops. The fourth verifying means 115 will verify the compatibility of the specific software-deployment data DSD (CSE, CST, CSI) transmitted beforehand by the first verifying means 112 with the general software-deployment data DGD (CGE, CGT, CGI). For example, the fourth verifying means 115 will analyze whether the group of identifiers of the criterion CSI indeed belongs to the type of identifier of the criterion CGI. If the identifier group indeed belongs to this type of identifier, the second verifying means send an OK message to the receiving means 111. These receiving means 11 will then transmit the software data BIN and the digital signature ENum to the software-modifying means 116. Otherwise, a NOK message is transmitted to said receiving means 11 and the process ends. The software-modifying means 116 comprise a hash function Hach. This function Hach is identical to the hash function that originally generated the digital fingerprint ENum. Thus, the software-modifying means 116 apply this function Hach to the software data BIN. In the case where the result of this operation is identical to the digital fingerprint ENum, the computer 11 deduces that the software data BIN have not been altered by a malicious participant in the course of their transmission and that a software modification may be instigated in the motor vehicle. Otherwise, the software modification in the motor vehicle does not take place.

FIG. 3 illustrates an overall architecture 30 for implementing a software modification in the motor vehicle. This overall architecture 30 comprises:

- a database 31 for storing software data and general software-deployment data;
- a server 35;
- means 37 for generating a download request;
- the computer 11 of the motor vehicle 10.

The database 31 is able to store a first data group. As already indicated, this first data group comprises software data BIN and general deployment data DGD (CGE, CGT, CGI). The software data BIN will have been generated beforehand by a supplier of the software in question. The data DGD (CGE, CGT, CGI) will have been generated beforehand and signed by a primary supervisory authority 32. This signature is made using the first private key 321. This primary supervisory authority 32 is managed by a main security officer and a firmware manager (not shown in FIG. 3). They are able to define deployment permissions with various criteria:

- permission 1: the firmware may be deployed with VIN-code limitation (general identification criterion);
- permission 2: the firmware may be deployed for a given range of vehicles (general identification criterion);
- permission 3: the firmware may be deployed at the factory, at a dealership or at the customer's home (general location criterion);
- permission 4: the firmware may be deployed in the development phase, during a factory update (vehicle with less than 10 km on the clock), or during use (general time criterion);

It will be noted that some permissions are a combination of a general identification/location/time criterion with a specific identification/location/time criterion, such as:

- permission 5: the firmware may be deployed at the customer's home (specific location criterion) with VIN-code limitation (general identification criterion);
- permission 6: the firmware may be deployed only in the development phase (specific time criterion) for a given vehicle range (general identification criterion).

The server 35 is able to interrogate the database 31 in order to associate the data of the first data group BIN, DGD (CGE, CGT, CGI), ENum with data of a second data group DSD (CSE, CST, CSI) in a single database 36. The data of the second data group DSD (CSE, CST, CSI) are generated on the fly based on a request REQ originating from the generating means 37. These data DSD (CSE, CST, CSI) are signed using the second private key 341.

It is the entity in charge of the software deployment (not shown in FIG. 3) via the server 35 that will ensure, on generation of the second data group DSD (CSE, CST, CSI), their consistency with the first data group BIN, DGD (CGE, CGT, CGI).

It is this entity in charge of the software deployment that is able to define the actual deployment policies. More particularly, in the case where deployment is via a removable storage medium, such as a USB key 38, the actual deployment policies may be, by way of example and non-exhaustively:

- policy 1: the USB key 38 is applicable at dealerships only for the VIN code VINx;
- policy 2: the USB key 38 may be applied only within 10 days of its creation.

The generating means 37 are able to generate the request REQ and address it to the server 35, with a view to a software modification. This request is generated on the initiative of a user, such as a research department 371 of the manufacturer, a factory 372 of the manufacturer, a dealership 373, or the customer 374 who bought the motor vehicle 10. The request REQ is, for example, a request according to the HTTP Internet protocol (HTTP being the acronym of HyperText Transfer Protocol). In response, the generating means 37 transmit the first data group BIN, DGD (CGE, CGT, CGI), ENum and the second data group DSD (CSE, CST, CSI) on the software update request. In one particular embodiment, the request REQ comprises a secret code obtained beforehand by the user in order to secure the transfer of the first data group and of the second data group from the server 35 to the generating means 37.

The first data group and the second data group are then stored on the USB key 38. This USB key 38 is, for example, any commercially available key. As a variant, the USB key 38 is dedicated to software-modification operations. This USB key 38 was for example provided beforehand by the manufacturer of the motor vehicle 10.

The USB key 38 thus comprises means for storing the first data group and the second data group. The USB key 38 also comprises means for transferring this first data group BIN, DGD (CGE, CGT, CGI), ENum and this second data group DSD (CSE, CST, CSI) to the computer 11 of the motor vehicle 10. As was mentioned above, this computer 11 comprises the first public key 1141 complementary to the first private key 321, and the second public key 1121 complementary to the second private key 341.

Figure 4:
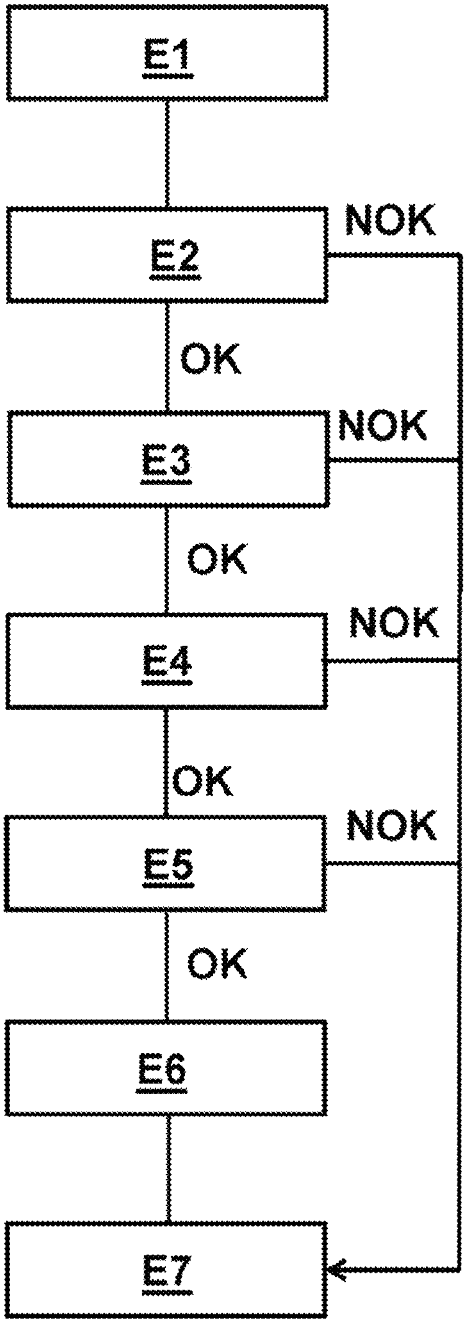
FIG. 4 illustrates the various steps of the method for bringing about a software modification in the computer of FIG. 2.

The computer 11 thus allows the method for bringing about the software modification in the motor vehicle 10 to be implemented. The steps of this method are in particular illustrated in FIG. 4. The method thus comprises a step E1 of receiving the first data group BIN, DGD (CGE, CGT, CGI), ENum and the second data group DSD (CSE, CST, CSI). The method then implements a succession of verifying steps. In a first verifying step E2, the data signature of the second data group DSD (CSE, CST, CSI) is verified. If this signature is compliant (OK), the method passes to a second verifying step E3. Otherwise (NOK), the method for bringing about the software modification is stopped in a step E7. In the second verifying step E3, the compatibility of the specific software-deployment data DSD is compared with the specific characteristics CP of the motor vehicle 10. If the compatibility is compliant (OK), the method passes to a third verifying step E4. Otherwise (NOK), the method for bringing about the software modification is stopped in a step E7. In the third verifying step E4, the data signature of the first data group DGD (CGE, CGT, CGI), ENum is verified. If this signature is compliant (OK), the method passes to a fourth verifying step E5. Otherwise (NOK), the method for bringing about the software modification is stopped in a step E7. In the fourth verifying step E5, the compatibility of the specific software-deployment data is compared with the general software-deployment data. If the compatibility is compliant (OK), a software modification in the motor vehicle via the software data BIN of the first data group is instigated in a step E6. Otherwise (NOK), the method for bringing about the software update is stopped in a step E7.

Thus, considering examples permission 1 to permission 6 and examples policy 1 and policy 2 of the preceding paragraphs, the computer 11 will verify overall consistency, namely:

- that the signature of the data of the first data group and the signature of the data of the second data group are valid, i.e. that the first private key and the second private key are valid and known;
- that the entity in charge of software deployment has indeed entered a VIN code corresponding to the vehicle (permission 1, policy 1 and specific characteristics CP of the motor vehicle);
- that the motor vehicle possesses a piece of firmware (permission 4 and specific characteristics CP of the motor vehicle);
- that the vehicle is at a dealership (permission 3, policy 1 and specific characteristics CP of the motor vehicle).

The invention thus makes it possible to supplement, with appropriate deployment policies, the deployment permissions generated by the primary supervisory authority. Furthermore, the entity in charge of software deployment may specify a deployment policy while ensuring that it is compatible with the deployment permissions imposed by the primary supervisory authority.

The computer 11 is then responsible for verifying consistency between the deployment policies of the software data and the deployment permissions of these software data. The computer 11 will permit installation of a new piece of software or permit software to be updated only if the deployment policy of this software or update is permitted by the deployment permissions.

In one preferred embodiment, the computer 11 generates a digital fingerprint from the software data BIN. This generated digital fingerprint is compared to the digital fingerprint ENum of the software data of the first data group. In the case where the digital fingerprints are identical, the software modification is permitted. Otherwise, the software modification is cancelled.

The invention also relates to a computer program product comprising program instructions that are exploitable by the automotive computer 11. These instructions, when they are executed or interpreted by the computer 11, trigger implementation of the method for bringing about the software modification in the motor vehicle 10.

The invention is not limited to the embodiments and variants described and other embodiments and variants will appear obvious to those skilled in the art.

Thus, the general software-deployment data DGD and the digital fingerprint Enum are signed by two different private keys to improve the overall level of cyber-protection against hacking.

Thus, the research department 371 of the manufacturer or the factory 372 of the manufacturer or the dealership 373 uses a defined pair of private/public keys to obtain the first data group and the second data group in a secure manner. These data are intended to be loaded onto the USB key 38.

Thus, the first data group and the second data group may be transferred between the server 35 and the motor vehicle 10 via FOTA wireless technology.

Thus, software may be updated a plurality times during use of the motor vehicle. It is then possible to implement new hashing techniques during these updates.

The invention claimed is:

1. A method for bringing about a software modification in a motor vehicle, said method comprising the following steps implemented in said motor vehicle:

- receiving a first data group and a second data group, said first data group comprising software data and general software-deployment data, said general software-deployment data having been signed by a primary supervisory authority to determine a signature of the general software-deployment data, said second data group comprising specific software-deployment data, said specific software-deployment data being choices among the general software-deployment data, said specific software-deployment data having been signed by a secondary supervisory authority to determine a signature of the specific software-deployment data;
- verifying, in a first verifying step, the signature of the specific software-deployment data;
- verifying, in a second verifying step, the compatibility of the specific software-deployment data with specific characteristics of the motor vehicle;

verifying, in a third verifying step, the signature of the general software-deployment data;

verifying, in a fourth verifying step, the compatibility of the specific software-deployment data with the general software-deployment data; and modifying, when the first verifying step, the second verifying step, the third verifying step, and the fourth verifying step are validated, software in the motor vehicle via the software data of the first data group, wherein the general deployment data of the software comprise at least one of the following criteria for deployment of the software:

a general space criterion for software deployment, a general time criterion for software deployment, and a general identification criterion for identifying the vehicles concerned by the software deployment, wherein the specific deployment data of the software comprise at least one of the following criteria:

a specific space criterion for software deployment;

a specific time criterion for software deployment; and a specific identification criterion for identifying the vehicles concerned by the software deployment, and the general space criterion for software deployment defines all possible locations in which software deployment may be carried out including locations that are not be included in the specific deployment data, and the specific space criterion is a choice among the locations, the general time criterion for software deployment defines all of the time ranges in which software deployment may be carried out including time ranges that are not be included in the specific deployment data, and the specific space criterion is a choice among the time ranges, and the general identification criterion defines all possible types of identifiers including types of identifiers that are not be included in the specific deployment data, and the specific identification criterion is a choice of a group of identifiers for the type of identifier, wherein the first data group comprises a digital fingerprint of the software data, said digital fingerprint having been obtained by a hash function and wherein this digital fingerprint is compared with a digital fingerprint generated in the motor vehicle from the software data with a view to implementing the modifying.

2. The method as claimed in claim 1, wherein the locations in which software deployment may be carried out include in a factory, at a dealership, and at an individual's home.

3. The method as claimed in claim 1, wherein the type of identifier includes a vehicle identification number.

4. The method as claimed in claim 1, wherein the general software-deployment data are signed with a first private key and said signature is verified with a first public key associated with said first private key and wherein the specific software-deployment data are signed with a second private key and said signature is verified with a second public key associated with said second private key.

5. The method as claimed in claim 1, wherein the modifying corresponds to introduction of new software and/or to update of software already installed in said vehicle.

6. The method as claimed in claim 1, wherein the first data group and the second data group are received by connecting, to said motor vehicle, a removable storage medium, and the specific deployment data of the software comprise at least one criterion related to said removable storage medium.

7. The method as claimed in claim 6, wherein the removable storage medium is a USB key.

8. An automotive computer configured to be used in a motor vehicle, comprising:

one or more processors configured to receive a first data group and a second data group, said first data group comprising software data and general software-deployment data, said general software-deployment data having been signed by a primary supervisory authority, said general deployment data of the software comprising at least one of the following criteria for software deployment:

a general space criterion for software deployment, a general time criterion for software, and a general identification criterion for identifying the vehicles concerned by the software deployment, said second data group comprising specific software-deployment data, said specific software-deployment data being choices among the general software-deployment data, said specific software-deployment data having been signed by a secondary supervisory authority;

verify the signature of the specific software-deployment data;

verify the compatibility of the specific software-deployment data with specific characteristics of the motor vehicle;

verify the signature of the general software-deployment data;

verify the compatibility of the specific software-deployment data with the general software-deployment data; and modify software in the motor vehicle via the software data of the first data group, wherein the specific deployment data of the software comprise at least one of the following criteria:

a specific space criterion for software deployment;

a specific time criterion for software deployment; and a specific identification criterion for identifying the vehicles concerned by the software deployment, and the general space criterion for software deployment defines all possible locations in which software deployment may be carried out including locations that are not be included in the specific deployment data, and the specific space criterion is a choice among the locations, the general time criterion for software deployment defines all of the time ranges in which software deployment may be carried out including time ranges that are not included in the specific deployment data, and the specific space criterion is a choice among the time ranges, and the general identification criterion defines all possible types of identifiers including types of identifiers that are not be included in the specific deployment data, and the specific identification criterion is a choice of a group of identifiers for the type of identifier, wherein the first data group comprises a digital fingerprint of the software data, said digital fingerprint having been obtained by a hash function and wherein this digital fingerprint is compared with a digital fingerprint generated in the motor vehicle from the software data with a view to implementing the modifying.

9. A non-transitory removable storage medium configured to be used in a motor vehicle, comprising:

means for storing a first data group and a second data group, said first data group comprising software data and general software-deployment data, said general software-deployment data having been signed by a primary supervisory authority, said general deployment data of the software comprising at least one of the following criteria for software deployment:

a general space criterion for software deployment, a general time criterion for software deployment, and a general identification criterion for identifying the vehicles concerned by the software deployment, said second data group comprising specific software-deployment data, said specific software-deployment data being choices among the general software-deployment data, said specific software-deployment data having been signed by a secondary supervisory authority; and wherein a computer connected with the non-transitory removable storage medium is configured to transfer the first data group and the second data group to the motor vehicle, the signature of the specific software-deployment data being configured to be verified in said motor vehicle in a first verifying step, the specific deployment data of the software being configured to be verified in order to assess their compatibility with specific characteristics of the motor vehicle in a second verifying step, the signature of the general software-deployment data being configured to be verified in said motor vehicle in a third verifying step, the specific software-deployment data and the general software-deployment data being configured to be verified in order to assess their compatibility in a fourth verifying step, the software data of the first data group being configured to perform a software modification in the motor vehicle when the first verifying step, the second verifying step, the third verifying step, and the fourth verifying step are validated, wherein the specific deployment data of the software comprise at least one of the following criteria:

a specific space criterion for software deployment;

a specific time criterion for software deployment; and a specific identification criterion for identifying the vehicles concerned by the software deployment, and the general space criterion for software deployment defines all possible locations in which software deployment may be carried out including locations that are not be included in the specific deployment data, and the specific space criterion is a choice among the locations, the general time criterion for software deployment defines all of the time ranges in which software deployment may be carried out including time ranges that are not included in the specific deployment data, and the specific space criterion is a choice among the time ranges, and the general identification criterion defines all possible types of identifiers including types of identifiers that are not be included in the specific deployment data, and the specific identification criterion is a choice of a group of identifiers for the type of identifier, wherein the first data group comprises a digital fingerprint of the software data, said digital fingerprint having been obtained by a hash function and wherein this digital fingerprint is compared with a digital fingerprint generated in the motor vehicle from the software data with a view to implementing the modifying.

* * * * *